(12) United States Patent
Aono et al.

(10) Patent No.: US 6,903,035 B2
(45) Date of Patent: Jun. 7, 2005

(54) INORGANIC COMPOSITION, FILM, AND METHOD OF PRODUCING FILM

(75) Inventors: Toshiaki Aono, Shizuoka-ken (JP); Keisuke Ozeki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/206,965

(22) Filed: Jul. 30, 2002

(65) Prior Publication Data

US 2003/0116061 A1 Jun. 26, 2003

(30) Foreign Application Priority Data

Jul. 31, 2001 (JP) ........................................ 2001-232047

(51) Int. Cl.$^7$ ............................. C03C 14/00; C09D 1/00
(52) U.S. Cl. ........................ 501/12; 501/32; 106/286.8; 106/286.1
(58) Field of Search .................. 501/12, 32; 106/286.8, 106/286.1; 428/426, 447, 702; 516/110

(56) References Cited

U.S. PATENT DOCUMENTS

| | | | | |
|---|---|---|---|---|
| 5,026,412 A | * | 6/1991 | Ooishi et al. | 65/17.3 |
| 5,300,464 A | * | 4/1994 | Rittler | 501/5 |
| 5,558,701 A | * | 9/1996 | Patel | 427/2.27 |
| 5,783,506 A | * | 7/1998 | Eppler et al. | 501/14 |
| 5,925,428 A | * | 7/1999 | Hubbard et al. | 428/34.5 |
| 6,013,128 A | * | 1/2000 | Hubbard et al. | 106/600 |

FOREIGN PATENT DOCUMENTS

| | | |
|---|---|---|
| GB | 2 274 104 A | 7/1994 |
| JP | 6-287014 | 10/1994 |
| JP | 2538527 | 7/1996 |
| JP | 8-282112 | 10/1996 |
| JP | 9-175817 | 7/1997 |
| JP | 10-90828 | 4/1998 |
| WO | WO 97/47694 A1 | 12/1997 |

* cited by examiner

*Primary Examiner*—Karl Group
(74) *Attorney, Agent, or Firm*—Sughrue Mion, PLLC

(57) ABSTRACT

An inorganic composition comprises an inorganic matrix, wherein an inorganic layered compound is contained in the inorganic matrix. The inorganic matrix is preferably a metal oxide glass produced by a sol-gel method, and the inorganic layered compound is preferably swelling synthetic mica. A method of producing a film includes the steps of: hydrolyzing, dehydrating, and condensing an organic metal compound to obtain a reaction product; adding and dispersing the inorganic layered compound in the reaction product; coating the reaction product containing the inorganic layered compound on a substrate surface; and heating the substrate surface coated with the reaction product at a temperature of not more than 200° C. to vitrify the reaction product.

21 Claims, No Drawings

INORGANIC COMPOSITION, FILM, AND METHOD OF PRODUCING FILM

BACKGROUND OF THE INVENTION

1. Field of the Invention

The present invention relates to an inorganic composition, a film and a method of producing the film. More specifically, the invention relates to an inorganic composition that contains an inorganic layered composition within an inorganic matrix to provide excellent gas barrier characteristics even in high humidity, a film made from the inorganic composition, and a method of producing the film.

2. Description of the Related Art

It has conventionally been known that film containing an inorganic layered composition has high barrier characteristics with respect to gases such as oxygen, carbon dioxide and nitrogen oxide, and also to low molecular compounds.

For example, Japanese Patent Application Laid-Open (JP-A) No. 8-282112 discloses a multicolor heat-sensitive recording material that includes an intermediate layer and/or an undercoat layer. When an inorganic layered composition having a high aspect ratio is incorporated into the intermediate layer and/or the undercoat layer, it becomes possible to raise, with a thin film, barrier characteristics with respect to substances without adversely affecting transparency of respective layers.

Moreover, JP-A No. 10-90828 discloses that it is preferable to incorporate a swelling inorganic layered composition into layers of photographic elements (e.g., silver halogenide photosensitive materials) to thereby control interlayer spreading of photographic compounds (e.g., pigments) added to respective layers of the photographic elements and to prevent atmospheric gases from spreading into the photographic element layers.

Synthetic mica is preferably used as swelling inorganic layered compound. Moreover, a hydrophilic colloid, such as gelatin, or a synthetic hydrophilic polymeric substance, such as polyvinyl alcohol, is preferably used as a binder in the layer(s) to which the inorganic layered compound is added.

When a hydrophilic colloid such as gelatin or a synthetic hydrophilic polymeric substance such as polyvinyl alcohol is used as a binder in film or in the layer(s) to which the inorganic layered compound is added, it has high barrier characteristics with respect to gases and low molecular compounds in low humidity (i.e., in a dry environment) and exhibits excellent performance. However, barrier characteristics drop remarkably in high humidity (80% RH or higher), which results in an inability of the inorganic compound to sufficiently function as a layer (film) to control dispersion and the like of substances.

There has thus been a strong demand for an inorganic composition containing an inorganic layered composition whose barrier characteristics with respect to gases and low molecular compounds do not drop even in high humidity (80% RH or higher) and that is capable of controlling substance dispersion, and a film made from the inorganic composition.

Examples of techniques for forming an oxide coating film or film on a base material conventionally include melting, such as glass lining and ceramic coating, solution immersion using liquid phases, and a sol-gel method.

In the sol-gel method, water-containing oxide sol, such as metallic cation and metal alkoxide, is dehydrated to form a gel, and the gel is heated to prepare an inorganic oxide having a fixed shape (e.g., film, particle, fiber etc.). This method is known because synthesis is possible at low temperatures, highly pure products can be prepared thereby, and control of compositions is easy (see Japanese Patent No. 2538527).

However, there have been proposals with respect to film that is prepared by the sol-gel method and is thin, has superior barrier characteristics with respect to gases and substances such as low molecular compounds, and that can function as a heat-sensitive recording material and photosensitive material.

SUMMARY OF THE INVENTION

The present invention has been devised to solve the above-mentioned conventional problems, and is designed to achieve the following objects.

It is an object of the invention to provide an inorganic composition that has superior barrier characteristics with respect to gases and low molecular compounds even in high humidity and that is suited for the formation of a film that functions excellently to control substance dispersion. It is another object of the invention to provide a film that is made from the inorganic composition and has excellent barrier characteristics and resistance to heat and high humidity. It is yet another object of the invention to provide a method by which such a film having high barrier characteristics in a normal temperature range can be efficiently formed without necessitating a step of high-temperature heating.

These objects are achieved by the following aspects of the invention.

A first aspect of the invention is an inorganic composition comprising an inorganic matrix, wherein an inorganic layered compound is contained in the inorganic matrix.

A second aspect of the invention is the inorganic composition of the first aspect, wherein the inorganic matrix contains at least one selected from the group consisting of a silicate, a metal phosphate, a silazane polymer, a phosphazene compound and metal oxide glass.

A third aspect of the invention is the inorganic composition of the first aspect, wherein the inorganic matrix comprises metal oxide glass produced by a sol-gel method.

A fourth aspect of the invention is the inorganic composition of the first aspect, wherein the sol-gel method comprises the steps of: hydrolyzing, dehydrating, and condensing an organic metal compound in a reaction solution containing at least water and an organic solvent, with halogen ions being used as a catalyst in the presence of boron ions while the pH is adjusted to 4.5 to 5.0, to obtain a reaction product; and heating the reaction product at a temperature of not more than 200° C. to vitrify the reaction product.

A fifth aspect of the invention is the inorganic composition according to the first aspect, wherein the inorganic composition is produced by a method including the steps of: hydrolyzing, dehydrating, and condensing an organic metal compound in a reaction solution containing at least water and an organic solvent, with halogen ions being used as a catalyst in the presence of boron ions while the pH is adjusted to 4.5 to 5.0, to obtain a reaction product; adding and dispersing the inorganic layered compound in the reaction product; and heating the reaction product containing the inorganic layered compound at a temperature of not more than 200° C. to vitrify the reaction product.

A sixth aspect of the invention is the inorganic composition according to the fifth aspect, wherein the organic solvent contained in the reaction solution contains at least one organic solvent selected from the group consisting of propanol, isopropanol, butanol, and isobutanol.

A seventh aspect of the invention is inorganic composition according to the fifth aspect, wherein the concentration of the water contained in the reaction solution is 0.2 to 50 mol/L.

An eighth aspect of the invention is inorganic composition according to the fifth aspect, wherein the concentration of the boron ions in the reaction solution is 1.0 to 10.0 mol/L.

A ninth aspect of the invention is the inorganic composition according to the fifth aspect, wherein the organic metal compound contains a metal alkoxide represented by the following formula (I):

$$MR^2_m(OR^1)_{n-m}$$

wherein, in the formula (I), M represents a metal having an oxidation number of n; each of $R^1$ and $R^2$ independently represents an alkyl group; m represents an integer of 0 to (n-1); and $R^1$ and $R^2$ may be the same or mutually different.

A tenth aspect of the invention is the inorganic composition according to the ninth aspect, wherein the metal alkoxide represented by the formula (I) is selected from the group consisting of lithium ethoxide, niobium ethoxide, magnesium isopropoxide, aluminum isopropoxide, zinc propoxide, tetraethoxy silane, titanium isopropoxide, barium ethoxide, barium isopropoxide, triethoxy borane, zirconium propoxide, lanthanum propoxide, yttrium propoxide, and lead propoxide.

An eleventh aspect of the invention is the inorganic composition according to the fifth aspect, wherein the halogen ions are at least one of fluorine ions and chlorine ions.

A twelfth aspect of the invention is the inorganic composition according to the fifth aspect, wherein the concentration of halogen ions in the reaction solution is 0.001 to 2 mol/kg.

A thirteenth aspect of the invention is the inorganic composition according to the first aspect, wherein the inorganic layered compound has an aspect ratio of no less than 30.

A fourteenth aspect of the invention is the inorganic composition according to the first aspect, wherein the inorganic layered compound has an aspect ratio of no less than 100.

A fifteenth aspect of the invention is the inorganic composition according to the first aspect, wherein the inorganic layered compound comprises at least one of swelling synthetic mica and smectite.

A sixteenth aspect of the invention is the inorganic composition according to the first aspect, wherein the inorganic composition includes a surface that is made hydrophobic by at least one of a tertiary salt compound and a quaternary salt compound.

A seventeenth aspect of the invention is the inorganic composition according to the sixteenth aspect, wherein the at least one of the tertiary salt compound and the quaternary salt compound is selected from the group consisting of an amine salt compound, a pyridinium compound, a quaternary ammonium salt compound, a quaternary ammonium salt compound including a polyoxyethylene group, a quaternary ammonium salt compound including a polypropylene group, and a cation surfactant.

An eighteenth aspect of the invention is the inorganic composition according to the first aspect, wherein the content of the inorganic layered compound is 0.001 to 0.2 at mass ratio, with respect to the inorganic matrix.

A nineteenth aspect of the invention is a film comprising an inorganic composition having an inorganic matrix, wherein an inorganic layered compound is contained in the inorganic matrix.

A twentieth aspect of the invention is A method of producing a film comprising the steps of: hydrolyzing, dehydrating, and condensing an organic metal compound in a reaction solution containing at least water and an organic solvent, with halogen ions being used as a catalyst in the presence of boron ions while the pH is adjusted to 4.5 to 5.0, to obtain a reaction product; adding and dispersing the inorganic layered compound in the reaction product; coating the reaction product containing the inorganic layered compound on a substrate surface; and heating the substrate surface coated with the reaction product at a temperature of not more than 200° C. to vitrify the reaction product.

DESCRIPTION OF THE PREFERRED EMBODIMENTS

An inorganic composition, a film and a method for producing the film in accordance with the present invention will be described below. First, description will be given of the inorganic composition.

[Inorganic Composition]

The inorganic composition of the invention has an inorganic matrix and is characterized in that an inorganic layered compound is contained in the inorganic matrix.

Inorganic Matrix

Preferable examples of materials for the inorganic matrix include silicates, metal phosphates, silazane polymers, phosphazene compounds and metal oxide glass. These materials are preferable because they can evenly disperse and contain the inorganic layered compound, they can be formed into a film, and they have superior barrier characteristics with respect to gases and low molecular compounds, even in high humidity. Among these, metal oxide glass is more preferable.

The metal oxide glass may be a mono-component metal oxide glass or a multi-component metal oxide glass, and is preferably produced through the sol-gel method.

In the sol-gel method, a sol of a hydroxide is obtained by hydrolyzing an organic metal compound and then dehydrating the hydrolyzed organic metal compound to form a gel. The gel is heated to prepare an inorganic oxide having a fixed shape (e.g., film, particle, fiber etc.). It is possible to obtain a multi-component metal oxide glass by mixing several different sol solutions or by adding another metal ion thereto.

Metal oxide glass is preferably used as the inorganic matrix, and metal oxide glass produced by the sol-gel method is more preferably used. Metal oxide glass produced through the sol-gel method including the following steps is most preferably used.

In view of preventing fine pores from being generated and film from deteriorating due to high-temperature heating, the inorganic matrix is preferably produced through a sol-gel method that includes the steps of: obtaining a reaction product by hydrolyzing, dehydrating and condensing an organic metal compound in a reaction solution containing at least water and an organic solvent, with halogen ions being used as a catalyst in the presence of boron ions while the pH is adjusted to 4.5 to 5.0; and heating the reaction product at a temperature of not more than 200° C. to form the glass.

Although there are no particular limitations on the organic metal compound used in the sol-gel method as long as it can be hydrolyzed, a metal alkoxide is preferably used.

The metal alkoxide is represented by the following general formula (I).

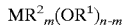
$MR^2_m(OR^1)_{n-m}$

In general formula (I), M represents a metal having an oxidation number of n, each of $R^1$ and $R^2$ independently represents an alkyl group, and m represents an integer of 0 to (n-1). $R^1$ and $R^2$ may be the same or different from each other.

With respect to $R^1$ and $R^2$, alkyl groups having not more than four carbon atoms are preferably used, and examples thereof include lower alkyl groups, such as a methyl group $CH_3$ (hereinafter, represented by Me), an ethyl group $C_2H_5$ (hereinafter, represented by Et), a propyl group $CH_3H_7$ (hereinafter, represented by Pr), an isopropyl group i-$C_3H_7$ (hereinafter, referred to as i-Pr), a butyl group $C_4H_9$ (hereinafter, represented by Bu), and an isobutyl group i-$C_4H_9$ (hereinafter, represented by i-Bu).

Preferable examples the metal alkoxide represented by general formula (I) include lithium ethoxide LiOEt, niobium ethoxide Nb(OEt)$_5$, magnesium isopropoxide Mg(OPr-i)$_2$, aluminum isopropoxide Al(OPr-i)$_3$, zinc propoxide Zn(OPr)$_2$, tetraethoxy silane Si(OEt)$_4$, titanium isopropoxide Ti(OPr-i)$_4$, barium ethoxide Ba(OEt)$_2$, barium isopropoxide Ba(OPr-i)$_2$, triethoxy borane B (OEt)$_3$, zirconium propoxide Zn(OPr)$_4$, lanthanum propoxide La(OPr)$_3$, yttrium propoxide Y(OPr)$_3$ and lead isopropoxide Pb(OPr-i)$_2$.

All of these metal alkoxides are commercially available and readily obtainable. Low condensation products obtained by partially hydrolyzing these metal alkoxides are also commercially available, and it is also possible to use these as the material.

Although the organic metal compound may be used as it is for the reaction in the sol-gel method, it is preferably diluted by a solvent and used in order to facilitate control of the reaction. Any diluting solvent may be used as long as it dissolves the organic metal compound and is mixed with water evenly. Preferable examples of the diluting solvent include lower aliphatic alcohols such as methanol, ethanol, propanol, isopropanol, butanol, isobutanol, ethylene glycol and propylene glycol and mixtures of these.

Moreover, a mixed solvent of butanol, cellosolve and butylcellosolve, or a mixed solvent of xylole, cellosolve acetate, methylisobutylketone and cyclohexane may be used.

When the metal in the organic metal compound is, for example, Ca, Mg, or Al, an alcohol solution of triethanol amine is preferably added to the reaction solution as a concealing agent because the metal reacts with water in the reaction solution to generate a hydroxide or generates a carbonate to cause deposition when carbonate ions $CO_3^{2-}$ exist.

The concentration of the organic metal compound when it is mixed and dissolved in the solvent is preferably not more than 70 mass %. It is even more preferable for the organic metal compound to be diluted to 5 to 70 mass % and used.

The reaction solution used in the sol-gel method contains at least water and an organic solvent.

Any solvent may be used as the organic solvent as long as it forms a uniform solution with water, acid, and alkali. Normally, the same aliphatic lower alcohols as those used to dilute the organic compound may be preferably used.

Among the aliphatic lower alcohols, propanol, isopropanol, butanol and isobutanol, all of which have more carbon atoms than methanol and ethanol, are preferably used in view of stabilizing the growth of the resulting metal oxide glass film.

The concentration of water in the reaction solution is preferably 0.2 to 50 mol/L.

In the sol-gel method, the organic metal compound is hydrolyzed in the reaction solution using halogen ions as a catalyst in the presence of boron ions.

Trialkoxy borane B (OR)$_3$ can be suitably used as a compound to provide the boron ions $B^{3+}$. Triethoxy borane B (OEt)$_3$ is more preferably used. The $B^{3+}$ ion concentration in the reaction solution is preferably 1.0 to 10.0 mol/L.

Fluorine ions and/or chlorine ions can be suitably used as the halogen ions. These may be used singly or in combination.

Any compound may be used as long as it generates fluorine ions and/or chlorine ions in the reaction solution. As the fluorine ion source, compounds such as ammonium hydrogen fluoride NH$_4$HF.HF and sodium fluoride NaF can be suitably used. As the chlorine ion source, ammonium chloride NH$_4$CH can be suitably used.

The concentration of the halogen ions in the reaction solution is, in general, preferably 0.001 to 2 mol/kg, and more preferably 0.002 to 0.3 mol/kg, with respect to the total mass of the reaction solution containing the catalyst. However, the concentration may vary depending on the thickness of the film composed of the inorganic composition having the inorganic matrix and other conditions. When the concentration of halogen ions is lower than 0.001 mol/kg, it becomes difficult for hydrolysis of the organic metal compound to sufficiently progress, whereby it becomes difficult to form the film. When the concentration of halogen ions exceeds 2 mol/kg, it is easy for the resulting inorganic matrix (metal oxide glass) to become uneven. Therefore, neither case is preferable.

It should be noted that when the obtained inorganic matrix contains boron used at the time of the reaction as a component of $B_2O_3$, the boron in the calculated amount of the organic boron compound corresponding to the amount of boron contained in the inorganic matrix as a $B_2O_3$ component can be added and does not have to be removed from the obtained inorganic matrix. If it desired that the boron be-removed, the formed film is heated in the presence of methanol as a solvent or immersed in methanol and heated, so that the boron evaporates as methyl esters of boron.

In the step in which the organic metal compound is hydrolyzed, dehydrated and condensed to obtain the reaction product, the reaction product is generally obtained by mixing and sufficiently stirring at a predetermined ratio a main agent solution, in which a predetermined amount of the organic metal compound is mixed and dissolved in a mixed solvent containing a predetermined amount of water and an organic solvent, and a predetermined amount of a reaction solution containing a predetermined amount of the halogen ions to obtain a uniform reaction solution. The reaction solution is then adjusted by acid or alkali to have a desired pH value and cured for several hours to thereby allow the reaction to progress to obtain the reaction product.

A predetermined amount of the boron compound is preliminarily mixed and dissolved in the main agent solution or the reaction solution. When alkoxy silane is used, it is effective to dissolve the alkoxy silane in the main agent solution together with another organic metal compound.

The pH of the reaction solution is selected according to the object. When the object is to form a film made of the inorganic composition having the inorganic matrix (metal oxide glass), it is preferable to adjust the pH to a range of 4.5 to 5 using an acid such as hydrochloric acid and then cure the reaction solution. In this case, it is convenient to use, for example, a mixture of methyl red and bromo cresol green as an indicator.

Next, the reaction product (the cured reaction solution) is heated to a temperature of not more than 200° C. and dried so that the reaction product vitrifies. In heating the reaction product, the temperature is gradually raised with special attention being paid to a temperature range of 50 to 70° C., and the temperature is preferably further raised after a preliminary drying (solvent vaporization). The preliminary drying is important for forming a poreless film. The temperature at which the reaction product is heated and dried after preliminary drying is preferably 70 to 150° C. and more preferably 80 to 130° C.

In the sol-gel method, the reaction product can also be produced by simply continuously adding, at the same concentrations and having the same components, the main agent solution and the reaction solution (containing $B^{3+}$ and halogen ions) one after the other at the same ratio while adjusting the pH of the mixture to a predetermined pH.

It should be noted that the concentration of the reaction solution may vary within a range of ±50 mass %, the concentration of water (containing acid or alkali) may vary within a range of ±30 mass %, and the concentration of halogen ions may vary within a range of ±30 mass %.

The inorganic matrix of the invention is preferably produced using the sol-gel method having the above-mentioned steps, and the inorganic composition of the invention contains the inorganic layered compound within the inorganic matrix.

In the invention, there are no particular limitations on how the inorganic layered compound is incorporated into the inorganic matrix. However, it is preferable to add and disperse the inorganic layered compound in the reaction product after the reaction product is obtained by hydrolyzing, dehydrating, and condensing the organic metal compound.

Once the inorganic layered compound has been added to the reaction product (the cured reaction solution), sufficiently mixed with the reaction product and swelled, the inorganic layered compound can be dispersed with a disperser. Examples of the disperser include various mills that effect dispersion by mechanically applying direct force, high-speed stirring dispersers having a large shearing force, and dispersers that supply strong ultrasonic energy.

Specific examples include a ball mill, a sand grinder mill, a visco mill, a colloid mill, a dissolver, a homogenizer, a polytron, a homomixer, a homoblender, a keddy mill, a jet adjuster, a capillary emulsifier, a liquid siren, an electromagnetic strictive ultrasonic wave generator, an emulsifying device with a Paulman whistle, a thin-film rotating high-speed mixer and an annular gap-type mill.

The reaction product to which the inorganic layered compound has been added and dispersed (hereinafter, sometimes referred to as "inorganic layered compound-containing reaction product") is vitrified at a temperature of not more than 200° C. to obtain the inorganic composition that contains the inorganic layered compound within the inorganic matrix.

Inorganic Layered Compound

The inorganic layered compound contained in the inorganic matrix will now be described.

Swelling inorganic layered compounds are preferable, and among these, for example, natural smectite, synthetic smectite and swelling synthetic mica are more preferable.

The inorganic layered compound has a laminated structure composed of a unit crystal latticed layer having a thickness of 10 to 15 angstroms.

Smectite assumes a structure comprising a tetrahedral sheet, in which Si—O tetrahedrals having a Si atom in the center are spread on a plane, and an octahedral sheet, having a metal atom such as Al or Mg in the center, at a 2:1 ratio.

In the smectite, the Si atom in the tetrahedral is substituted by the Al atom or the Al atom of the octahedral is substituted by the Mg atom, whereby crystal layers lack positive charges to make the surface charge negative.

A case where the Si atom is substituted by the Al atom in the tetrahedral is referred to as a tetrahedral substitution (tetrahedral charge). Examples of smectites having such a structure include beidellite, nontronite, volkonskoite and saponite.

A case where the Al atom is substituted by the Mg atom in the octahedral is referred to as an octahedral substitution (octahedral charge). Examples of smectites having such a structure include montmorillonite, hectorite and stevensite.

Preferable examples of natural smectites include montmorillonite, saponite and hectorite. Preferable examples of synthetic smectites include saponite, hectorite and stevensite.

Preferable examples of the swelling synthetic mica include:

Na tetrasic mica $NaMg_{2.5}(Si_4O_{10})F_2$
Na or Li taeniolite $(NaLi)Mg_2Li(Si_4O_{10})F_2$, and
Na or Li hectorite $(NaLi)_{1/3}Mg_{2/3} Li_{1/3}(Si_4O_{10})F_2$.

The inorganic layered compound has a laminated structure composed of a unit crystal latticed layer having a thickness of 10 to 15 angstroms, and the metal atom substitution within the lattice is extremely great in comparison with other clay minerals. Consequently, the latticed layer lacks a positive charge, and cations such as $Na^+$, $Ca^{2+}$ and $Mg^{2+}$ are adsorbed between layers to compensate therefor.

These interlayer cations are called exchangeable cations because they can be exchanged with various cations. In particular, when the interlayer cations are $Li^+$ and $Na^+$, the bonds in the layered crystal lattice are weak and great swelling is caused by water because the ion radius is small. When the inorganic layered compound is sheared in this state, cleavage occurs easily and a stable sol is formed in water. Swelling synthetic mica is preferably used because it exhibits a strong tendency to swell in this manner.

Since the surface of the inorganic layered compound is hydrophilic, the inorganic layered compound easily swells in water and is easily dispersed when sheared. In this case, water-miscible organic solvents, such as alcohols including methanol, ethanol, propanol, isopropanol, ethylene glycol and diethylene glycol, and dimethyl sulfoxide, dimethylformaldehyde and acetone, may be added thereto. Among these, ethanol, propanol, and isopropanol acetone are more preferably used.

Although the surface of the inorganic layered compound is hydrophilic, it can also be made hydrophobic by using a tertiary salt compound and/or a quaternary salt compound because the surface is negatively charged. The inorganic compound that is made hydrophobic can then be contained in the inorganic matrix of the inorganic composition of the invention.

Specific examples of the tertiary salt compound and quaternary salt compound include amine salt compounds such as lauryl amine hydrochloride (Pionin B-201), stearyl amine hydrochloride (Pionin B-801), oleyl amine acetate (Pionin B-709), stearyl amine acetate (Pionin B-809), stearylaminopropylamine acetate (Pionin B-104-DA), pyridinium salt compounds such as laurylpyridinium chloride (Pionin B-251), myristylpyridinium chloride (Pionin B-451) and cetylpyridinium chloride (Pionin B-651), and quaternary ammonium salt compounds, such as lauryltrimethylammonium chloride (Pionin B-211), cetyltrimethylammonium chloride (Pionin B-611), stearyltrimethylammonium chloride (Pionin B-811), dilauryldimethylammonium chloride (Pionin B-2211), distearyldimethylammonium chloride (Pionin B-8811), lauryldihydroxyethylmethylammonium chloride (Pionin B-221-B), oleylbispolyoxyethylenemethylammonium chloride (Pionin B-721-E), stearylhydroxyethyldimethylammonium chloride (Pionin B-821-A), lauryldimethylbenzylammonium chloride (Pionin B-231), lauroylaminopropyldimethylethylammonium ethosulfate (Pionin B-276) and lauroylaminopropyldimethylhydroxyethylammonium perchlorate (Pionin B-277) (parentheses indicate trade names in the Pionin B series made by Takemoto Oil & Fat Co., Ltd.).

The following quaternary ammonium salt compounds having a polyoxyethylene group can also be suitably used: polyoxyethylene, trialkylammoniumchloridepolyoxyethylene, trialkylammoniumbromidepolyoxyethylene, dialkylammoniumchloridepolyoxyethylene, dialkylammoniumacetatepolyoxyethylene, benzyl-dialkylammoniumchloridepolyoxyethylenepolyoxyethylene, benzyl-alkylammoniumbromidedi(polyoxyethylene), alkylammoniumchloridedi (polyoxyethylene), dialkylammoniumacetatedi(polyoxyethylene), benzyl-alkylammoniumchloridedi(polyoxyethylene), benzyl-alkylammoniumacetatedi(polyoxyethylene), dialkylammoniumchloridedi(polyoxyethylene), dialkylammoniumbromidetri(polyoxyethylene), alkylammoniumchloridetri(polyoxyethylene), and alkylammonium acetate.

The following quaternary ammonium salt compounds having a polypropylene group can also be suitably used: polyoxypropylene, trialkylammoniumchloridepolyoxypropylene, trialkylammoniumbromidedi(polyoxypropylene), dialkylammoniumchloridedi(polyoxypropylene), dialkylammoniumbromidetri(polyoxypropylene), alkylammoniumchloridetri(polyoxypropylene), and alkylammoniumbromide.

The cationic surfactants listed in the following Tables 1 to 4 can also be suitably used as tertiary salt compounds and quaternary salt compounds to make the inorganic layered compound hydrophobic.

TABLE 1

| Trade Name | Representative Composition | Molecular Formula |
|---|---|---|
| Nissan $M_2$-100 Cation | Tetradecyldimethylbenzylammonium chloride | $C_{14}H_{29}N^+(CH_3)_2CH_2$-phenyl $Cl^-$ |
| Nissan $S_2$-100 Cation | Octadecyldimethylbenzylammonium chloride | $C_{18}H_{37}N^+(CH_3)_2CH_2$-phenyl $Cl^-$ |
| *Nissan FBC Cation | Coconutalkylamine hydrochloride | $RNH_2 \cdot HCl$ |
| Nissan MA Cation | Tetradecylamine acetate | $C_{14}H_{29}NH_2 \cdot CH_3COOH$ |
| Nissan SA Cation | Octadecylamine acetate | $C_{18}H_{37}NH_2 \cdot CH_3COOH$ |
| Nissan DT Cation | N-tallow alkyl-N,N,N',N',N',-pentamethylpropylenediammonium dichloride | $\{R-N^+(CH_3)_2-C_3H_6-N^+(CH_3)_2-CH_3\}\ 2Cl^-$ |
| *Nissan DTA Cation | Tallow alkylpropylenediamine acetate | $RNHC_3H_6NH_2 \cdot (CH_3COOH)_2$ |
| Nissan DTA-B Cation | Tallow alkylpropylenediamine acetate | $RNHC_3H_6NH_2 \cdot (CH_3COOH)_2$ |
| Nissan AR4 Cation | 1-hydroxy-ethyl-2-alkyl(hardened tallow)imidazoline quaternary salt | imidazoline with R, $CH_3$, $CH_2CH_2OH$, $Cl^-$ |

TABLE 2

| Trade Name | Representative Composition | Molecular Formula |
|---|---|---|
| *Fillet$^Q$ | Coconutalkylisoquinolium bromide | 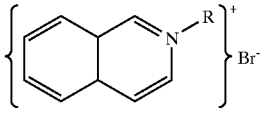 |
| Nissan 2-ABT Cation | Dihardened tallow alkyldimethylammonium chloride | $R_2N^+(CH_3)_2Cl^-$ |
| Nissan 2-OLR Cation | Dioleyldimethylammonium chloride | $(C_{18}H_{37})_2N^+(CH_3)_2Cl^-$ |
| Nissan 2-DB Cation | Didecyldimethylammonium chloride | $R_2N^+(CH_3)_2Cl^-$ |
| Nissan S-202 Cation | N,N-dipolyoxyethylene-N-stearyl-N-methyl-ammonium chloride | $R^1R^2N^+[(CH_2CH_2O)_n]_2Cl^-$ |
| Nissan T-650 Cation | Triethylmethylammonium chloride | — |
| Nissan 20L-205 Cation | N-polyoxyethylene-N,N-dioleyl-N-methyl-ammonium chloride | $(C_{18}H_{37})_2N^+(CH_3)_2.(CH_2CH_2O)_nCl^-$ |
| Nissan BI-F Cation | Special dialkyl cation | — |
| Nissan BI-FRS Cation | Special dialkyl cation | — |
| Nissan BB Cation | Dodecyltrimethylammonium chloride | $C_{12}H_{25}N^+(CH_3)_3Cl^-$ |
| Nissan BB-300 Cation | Dodecyltrimethylammonium chloride | $C_{12}H_{25}N^+(CH_3)_3Cl^-$ |
| Nissan FB Cation | Coconutalkyltrimethylammonium chloride | $RN^+(CH_3)_3Cl^-$ |
| — | Polyoxyisopropylenetriethylammonium chloride | 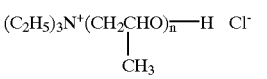 |

TABLE 3

| Trade Name | Representative Composition | Molecular Formula |
|---|---|---|
| Nissan FB-500 Cation | Coconutalkyltrimethylammonium chloride | $RN^+(CH_3)_3Cl^-$ |
| Nissan PB-40 Cation | Hexadecyltrimethylammonium chloride | $C_{16}H_{33}N^+(CH_3)_3Cl^-$ |
| Nissan PB-300 Cation | Hexadecyltrimethylammonium chloride | $C_{16}H_{33}N^+(CH_3)_3Cl^-$ |

TABLE 3-continued

| Trade Name | Representative Composition | Molecular Formula |
|---|---|---|
| Nissan ABT$_2$-500 Cation | Tallowalkyltrimethylammonium chloride | $RN^+(CH_3)_3Cl^-$ |
| *Nissan ABT-450 Cation | Hardened tallow alkyltrimethylammonium chloride | $RN^+(CH_3)_3Cl^-$ |
| Nissan AB Cation | Octadecyltrimethylammonium chloride | $C_{18}H_{37}N^+(CH_3)_3Cl^-$ |
| Nissan AB-600 Cation | Octadecyltrimethylammonium chloride | $C_{18}H_{37}N^+(CH_3)_3Cl^-$ |
| *Nissan AB-700P Cation | Octadecyltrimethylammonium chloride | $C_{18}H_{37}N^+(CH_3)_3Cl^-$ |
| Nissan VB Cation | Behenyltrimethylammonium chloride | $RN^+(CH_3)_3Cl^-$ |
| Nissan VBM Cation | Behenyltrimethylammonium chloride | $RN^+(CH_3)_3Cl^-$ |
| Nissan F$_2$conc Cation | Coconutalkyldimethylbenzylammonium chloride | $RN^+(CH_3)(CH_2C_6H_5)(CH_3)\ Cl^-$ |

TABLE 4

| Trade Name | Representative Composition | Molecular Formula |
|---|---|---|
| Nissan F$_2$-50 Cation | Coconutalkyldimethylbenzylammonium chloride | $RN^+(CH_3)(CH_2C_6H_5)(CH_3)\ Cl^-$ |
| Nissan F$_2$-50E Cation | Coconutalkyldimethylbenzylammonium chloride | $RN^+(CH_3)(CH_2C_6H_5)(CH_3)\ Cl^-$ |
| Nissan F$_2$-40E Cation | Coconutalkyldimethylbenzylammonium chloride | $RN^+(CH_3)(CH_2C_6H_5)(CH_3)\ Cl^-$ |
| Nissan F$_2$-35R Cation | Coconutalkyldimethylbenzylammonium chloride | $RN^+(CH_3)(CH_2C_6H_5)(CH_3)\ Cl^-$ |
| Nissan F$_2$-20R Cation | Coconutalkyldimethylbenzylammonium chloride | $RN^+(CH_3)(CH_2C_6H_5)(CH_3)\ Cl^-$ |

TABLE 4-continued

| Trade Name | Representative Composition | Molecular Formula |
|---|---|---|
| *Nissan E$_2$-40PO Cation | Special cation surfactant | — |

Among the above-mentioned tertiary salt compounds and quaternary salt compounds, compounds such as N,N-dipolyoxyethylene-N-stearyl-N-methylammonium chloride, dodecyltrimethylammonium chloride and polyoxyisopropylenetriethylammonium chloride are particularly preferable.

The tertiary salt compound and/or quaternary salt compound may be used singly, or two or more kinds thereof may be used in combination.

By making the inorganic layered compound hydrophobic using a tertiary salt compound and/or quaternary salt compound is meant that these compounds effect a cation exchange with respect to the inorganic layered compound. More specifically, the cation exchange can be effected by the following method. However, the invention is not limited to the same method.

In a first step, the inorganic layered compound is dispersed in water to obtain a suspension. The solid dispersion concentration in the suspension is preferably 1 to 15 mass %, but may be freely set as long as the inorganic layered compound is sufficiently dispersed. In this case, it is preferable to use an inorganic layered compound that has been preliminarily frozen and dried.

In a second step, a solution of the tertiary salt compound or quaternary salt compound is added to the inorganic layered compound suspension, or the inorganic layered compound is added to the solution so that the inorganic layered compound is made hydrophobic by cation exchange.

In a third step, solid matter is separated out from the liquid, and the inorganic layered compound that has been made hydrophobic is washed with water to sufficiently remove by-product electrolytes. The inorganic layered compound is then dried and ground as needed to obtain the desired product.

Although the reaction progresses sufficiently at room temperature, heat may be applied. The maximum heating temperature depends on the heat resistance of the tertiary salt compound or the quaternary salt compound to be used, and set to any temperature as long as it is lower than the decomposition point thereof.

The amount added of the above-mentioned tertiary salt compound and/or quaternary salt compound is preferably equivalent to the cation exchange capacity of the inorganic layered compound when converted as ions. However, production is also possible with an amount less than this. Moreover, the added amount may exceed the cation exchange capacity. The added amount is preferably 0.5 to 1.5 times (milliequivalent conversion) the cation ion exchange capacity of the inorganic layered compound, and more preferably 0.8 to 1.4 times the cation ion exchange capacity of the inorganic layered compound.

Description of how the inorganic layered compound is made hydrophobic is disclosed in detail in JP-A Nos. 6-287014 and 9-175817.

The aspect ratio of the inorganic layered compound is preferably not less than 20, more preferably not less than 30, still more preferably not less than 100, and even more preferably not less than 200, in view of barrier characteristics of the coating film. Moreover, when the inorganic layered compound comprises smectite, the aspect ratio is preferably 30 to 100. It should be noted that the aspect ratio is a ratio of particle thickness with respect to particle length.

With respect to the size of the particles in the inorganic layered compound, the average length is preferably 0.3 to 20 μm, more preferably 0.5 to 10 μm, and even more preferably 1 to 5 μm, in view of barrier characteristics and smoothness of the coating film.

The average thickness of the particles is preferably not more than 0.1 μm, more preferably not more than 0.05 μm, and even more preferably not more than 0.0 μm.

The inorganic composition of the invention is preferably produced by: hydrolyzing, dehydrating, and condensing an organic metal compound in a reaction solution containing at least water and an organic solvent, with halogen ions being used as a catalyst in the presence of boron ions while the pH is adjusted to 4.5 to 5.0, to obtain a reaction product; adding and dispersing the inorganic layered compound in the reaction product; and heating the reaction product containing the inorganic layered compound at a temperature of not more than 200° C. to vitrify the reaction product.

In the inorganic composition of the invention, one kind of the inorganic layered compound may be used alone, or two or more kinds of the compounds may be used in combination.

The amount of the inorganic layered compound contained in the inorganic matrix is preferably 0.001 to 0.2 at mass ratio with respect to the inorganic matrix. When the amount is less than 0.001, there is no effect of the barrier characteristics, and when the amount exceeds 0.2, there is a drop in film transparency. When two or more kinds of the inorganic layered compound are used, it is preferable for the total amount to be in the above-mentioned mass ratio.

[Film and Method of Producing the Film]

Description will now be given of the film of the invention and a method of producing the film.

The film of the invention is characterized in that it contains the inorganic composition of the invention.

The method of the film of the invention is characterized in that it comprises the steps of: hydrolyzing, dehydrating, and condensing an organic metal compound in a reaction solution containing at least water and an organic solvent, with halogen ions being used as a catalyst in the presence of boron ions while the pH is adjusted to 4.5 to 5.0, to obtain a reaction product; adding and dispersing the inorganic layered compound in the reaction product; coating the reaction product containing the inorganic layered compound on a substrate surface; and heating the substrate surface coated with the reaction product at a temperature of not more than 200° C. to vitrify the reaction product.

This method is similar to the sol-gel method of producing the inorganic matrix except that the reaction product containing the inorganic layered compound is coated on a substrate surface, and then the substrate surface coated with the reaction product is heated at a temperature of not more than 200° C. to vitrify the reaction product. Thus, it is possible to produce a film made from the inorganic composition of the invention.

A metal alkoxide is preferably used for the organic metal compound, and fluorine ions and/or chlorine ions are preferably used for the halogen ion.

Moreover, the reaction product containing the inorganic layered compound may be coated onto the surface of the base material as it is or after an appropriate thickener has been added thereto as needed.

Although any substrate may be used, materials such as polyethylene terephthalate, olefin-maleimide co-polymer and polycarbonate are preferably used in view of transparency and heat resistance.

The reaction product can be coated on the base material by, for example, extrusion coating, slide coating, gravure coating, rod coating, curtain coating, dip coating, knife coating, and flow coating. Among these, extrusion coating, slide coating and gravure coating are preferable.

The coated base material is heated at a temperature of not more than 200° C. and dried to vitrify base material. The temperature during heating is gradually raised with special attention being paid to a temperature range of 50 to 70° C., and the temperature is preferably further raised after preliminary (solvent vaporization) drying. This preliminary drying is important for forming a poreless film.

The thickness of the film is preferably 0.2 to 20 $\mu$m, and more preferably 0.5 to 10 $\mu$m, in view of transparency and barrier characteristics with respect to gases and low molecular compounds.

The amount of the inorganic layered compound in the film is preferably 0.005 to 1 g/m$^2$ and more preferably 0.01 to 0.5 g/m$^2$.

The film composed of the inorganic composition of the invention has excellent barrier characteristics with respect to gases and low molecular compounds because it contains the inorganic layered compound. The film is also disposed with the metal oxide glass formed by the sol-gel method as an inorganic matrix. The film can therefore be used as a barrier layer in products for which there is a demand for high barrier characteristics with respect to oxygen and water vapor, such as liquid crystal displays and EL elements.

EXAMPLES

The present invention will now be described by way of examples. However, the invention is limited to these examples.

Example 1

Preparation of Main Agent Solution and Reaction Solution

Tetraethoxysilane Si(OEt)$_4$ and a solvent were mixed at a mass ratio of 5:1. A mixed solvent composed of water, methanol, ethanol, and isopropanol at a mass ratio of 1:1:1:4 was used.

To this mixture was further added triethoxyborane B(OEt)$_3$ at a ratio of 0.2 mol/kg, and this was stirred and dissolved for 10 minutes to prepare a main agent solution.

The concentration of Si(OEt)$_4$ with respect to the isopropanol in the main agent solution was 70 mass % (20 mass % as SiO$_2$).

Next, acidic ammonium fluoride NH$_4$F—HF was used as a halogen ion source for a catalyst, and this was dissolved in a solvent identical to the mixed solvent used for the main agent solution. A reaction solution was thus prepared so as to have a fluorine ion concentration of 0.1 mol/kg with respect to the total weight of the mixed solvent and the acidic ammonium fluoride.

Preparation of Reaction Product

The main agent solution and reaction solution were mixed at a mass ratio of 3:1, stirred for 10 minutes, and the pH of the mixed solution (reaction solution) was then adjusted to 5.0 using hydrochloric acid and aqueous ammonium. An ethanol solution of methyl red and bromocresol green was used as an indicator. Thereafter, the mixed solution was aged for 3 hours, hydrolyzed, dehydrated, and condensed to obtain a reaction product (coating agent).

Preparation of Hydrophobic Inorganic Layered Compound

Next, an inorganic layered compound, swelling synthetic mica (trade name; ME-100; made by Co-op Chemical Co., Ltd.), was dispersed in water to prepare a 2.5 mass % suspension, and a 5 mass % aqueous solution of quaternary salt ammonium having the structure below was prepared. The suspension and the aqueous solution were mixed so that a mass ratio of the swelling synthetic mica to the quaternary salt ammonium was 1:1. After the mixture was subjected to cation exchange (to make the swelling synthetic mica hydrophobic) for 2 hours, the solid component was separated from the liquid, refined by washing it with water, and dried to provide hydrophobic swelling synthetic mica.

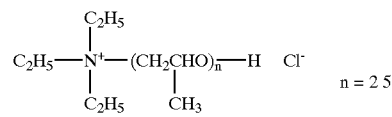

Preparation of Film

The hydrophobic swelling synthetic mica was added to the reaction product (coating agent), and dispersed with a sand mill.

Then, the reaction product containing the inorganic layered compound (coating agent containing the synthetic mica) was prepared so that the swelling synthetic mica was 10 mass % with respect to the total mass of the reaction product containing the inorganic layered compound.

The viscosity of the coating agent containing the synthetic mica was 97 cP, and the reaction product containing the inorganic layered compound (coating agent containing synthetic mica) was applied onto the surface of a base material, that is, a polyethylene terephthalate (PET) film having a thickness of 50 $\mu$m. The temperature of the coated substrate was gradually raised with special attention being paid to a temperature range of 50 to 70° C., and after preliminary (solvent vaporization) drying, the coated substrate was maintained at 120° C. for 30 minutes to bake and vitrify the coated substrate. The resulting film of the synthetic mica-containing metal oxide glass had a thickness (dried film thickness) of 3 $\mu$m.

Example 2

A film of synthetic mica-containing metal oxide glass (SiO$_2$) was prepared in the same manner as in Example 1, except that the content of the swelling synthetic mica was 5 mass % with respect to the total mass of the reaction product containing the inorganic layered compound. The viscosity of the coating agent containing the synthetic mica was 58 cP, and the thickness (dried film thickness) of the resulting film was 3 $\mu$m.

Example 3

A film of synthetic mica-containing metal oxide glass (SiO$_2$) was prepared in the same manner as in Example 1, except that the content of the swelling synthetic mica was 2.5 mass % with respect to the total mass of the reaction product containing the inorganic layered compound. The viscosity of the coating agent containing the synthetic mica was 30 cP, and the thickness (dried film thickness) of the resulting film was 3 $\mu$m.

Example 4

A film of synthetic mica-containing metal oxide glass (SiO$_2$) was prepared in the same manner as in Example 1, except that swelling synthetic mica (trade name ME-100; made by Co-op Chemical Co., Ltd.) that had not been made hydrophobic was used. The viscosity of the coating agent containing the synthetic mica was 89 cP, and the thickness (dried film thickness) of the resulting film was 3 µm.

Comparative Example 1

A film of synthetic mica-containing metal oxide glass (SiO$_2$) was prepared in the same manner as in Example 1, except that the swelling synthetic mica was not added. The viscosity of the coating agent containing the synthetic mica was 10 cP, and the thickness (dried film thickness) of the resulting film was 3 µm.

Comparative Example 2

20 g of a 2.5 mass % dispersion solution of swelling synthetic mica (trade name ME-100; Co-op Chemical Co., Ltd.) that had not been made hydrophobic was gradually added to 100 g of a 5 mass % aqueous solution of polyvinyl alcohol PVA 105 (made by Kuraray Co., Ltd.) while stirring the same to prepare a coating agent containing the synthetic mica. This was applied to a PET film having a thickness of 50 µm to form a film. The thickness (dried film thickness) of the resulting film was 3 µm.

Measurements and Evaluation

The film quality of each of the films obtained in Examples 1 to 4 and Comparative Examples 1 and 2 was visually evaluated, and film thickness, synthetic mica percentage content, and oxygen permeability were measured under the conditions shown in Table 5. The results are shown in Table 5.

Measurement of Oxygen Permeability

Oxygen permeability of the obtained films was measured using an OX-TRANS 2/20 (made by MOKON Co., Ltd.) under conditions of 40° C. and 90% RH.

From the above results, it was confirmed that the inorganic composition and the film made from the inorganic composition of the invention have superior barrier characteristics with respect to oxygen and vapor not only under low-temperature conditions, but also under high-temperature conditions (40° C., 90% RH).

According to the invention, it is possible to provide an inorganic composition that has superior barrier characteristics with respect to gases and low molecular compounds even in high humidity and that is suited for the formation of a film that functions excellently to control substance dispersion. It is also possible to provide a film that is made from the inorganic composition and has excellent barrier characteristics and resistance to heat and high humidity. It is also possible to provide a method by which such a film having high barrier characteristics in a normal temperature range can be efficiently formed without necessitating a step of high-temperature heating.

What is claimed is:

1. An inorganic composition for a film having transparency, said inorganic composition consisting essentially of an inorganic matrix and a swelling inorganic layered compound, wherein the inorganic matrix consists essentially of metal oxide glass produced by a sol-gel method and the swelling inorganic layered compound is present within the inorganic matrix.

2. The inorganic composition according to claim 1, wherein the sol-gel method comprises the steps of:

hydrolyzing, dehydrating, and condensing an organic metal compound in a reaction solution containing at least water and an organic solvent, with halogen ions being used as a catalyst in the presence of boron ions while the pH is adjusted to 4.5 to 5.0, to obtain a reaction product; and heating the reaction product at a temperature of not more than 200° C. to vitrify the reaction product.

3. The inorganic composition according to claim 1, when the inorganic composition is produced by a method including the steps of:

hydrolyzing, dehydrating, and condensing an organic metal compound in a reaction solution containing at

TABLE 5

| | Film quality | Content of synthetic mica (mass %)[*1] | Film thickness (µm) | Measurement conditions | Oxygen permeability[*2] |
|---|---|---|---|---|---|
| Example 1 | Metal oxide glass film containing hydrophobic synthetic mica | 10 | 3 | 40° C. 90% RH | 2.5 |
| Example 2 | Metal oxide glass film containing hydrophobic synthetic mica | 5 | 3 | 40° C. 90% RH | 3.8 |
| Example 3 | Metal oxide glass film containing hydrophobic synthetic mica | 2.5 | 3 | 40° C. 90% RH | 4.2 |
| Example 4 | Metal oxide glass film containing water-swelling synthetic mica | 10 | 3 | 40° C. 90% RH | 5 |
| Comparative Example 1 | Metal oxide glass film | — | 3 | 40° C. 90% RH | 315 |
| Comparative Example 2 | Polyvinyl alcohol film containing water-swelling synthetic mica | 10 | 3 | 40° C. 90% RH | 145 |

[*1]Value with respect to inorganic matrix
[*2]cc/m$^2$ · day · atm least water and an organic solvent, with halogen ions being used as a catalyst in the presence of boron ions while the pH is adjusted to 4.5 to 5.0, to obtain a reaction product;

adding and dispersing the inorganic layered compound in the reaction product; and heating the reaction product containing the inorganic layered compound at a temperature of not more than 200° C. to vitrify the reaction product.

4. The inorganic composition according to claim 3, wherein the organic solvent contained in the reaction solution contains at least one organic solvent selected from the group consisting of propanol, isopropanol, butanol, and isobutanol.

5. The inorganic composition according to claim 3, wherein the concentration of the water contained in the reaction solution is 0.2 to 50 mol/L.

6. The inorganic composition according to claim 3, wherein the concentration of the boron ions in the reaction solution is 1.0 to 10.0 mol/L.

7. The inorganic composition according to claim 3, wherein the organic metal compound contains a metal alkoxide represented by the following formula (I):

$$MR^2{}_m(OR^1)_{n-m}$$

wherein, in the formula (I), M represents a metal having an oxidation number of n; each of $R^1$ and $R^2$ independently represents an alkyl group; m represents an integer of 0 to (n−1); and $R^1$ and $R^2$ may be the same or mutually different.

8. The inorganic composition according to claim 7, wherein the metal alkoxide represented by the formula (I) is selected from the group consisting of lithium ethoxide, niobium ethoxide, magnesium isopropoxide, aluminum isopropoxide, zinc propoxide, tetraethoxy silane, titanium isopropoxide, barium ethoxide, barium isopropoxide, triethoxy borane, zirconium propoxide, lanthanum propoxide, yttrium propoxide, and lead propoxide.

9. The inorganic composition according to claim 3, wherein the halogen ions are at least one of fluorine ions and chlorine ions.

10. The inorganic composition according to claim 3, wherein the concentration of halogen ions in the reaction solution is 0.001 to 2 mol/kg.

11. The inorganic composition according to claim 1, wherein the inorganic layered compound has an aspect ratio of no less than 30.

12. The inorganic composition according to claim 1, wherein the inorganic layered compound has an aspect ratio of no less than 100.

13. The inorganic composition according to claim 1, wherein the inorganic layered compound comprises at least one of swelling synthetic mica an smectite.

14. The inorganic composition according to claim 1, wherein the inorganic layered compound includes a surface that is made hydrophobic by at least one of a tertiary salt compound and a quaternary salt compound.

15. The inorganic composition according to claim 14, wherein the at least one of the tertiary salt compound and the quaternary salt compound is selected from the group consisting of an amine salt compound, a pyridinium compound, a quaternary ammonium salt compound, a quaternary ammonium salt compound including a polyoxyethylene group, a quaternary ammonium salt compound including a polypropylene group, and a cationic surfactant.

16. The inorganic composition according to claim 1, wherein the content of the inorganic layered compound is 0.001 to 0.2 at mass ratio, with respect the inorganic matrix.

17. A transparent film comprising an inorganic composition, said inorganic composition consisting essentially of an inorganic matrix and a swelling inorganic layered compound, wherein the inorganic matrix consists essentially of metal oxide glass produced by a sol-gel method and the swelling inorganic layered compound is present within the inorganic matrix.

18. A method of producing a film comprising the steps of:

hydrolyzing, dehydrating, and condensing an organic metal compound in a reaction solution containing at least water and an organic solvent, with halogen ions being used as a catalyst in the presence of boron ions while the pH is adjusted to 4.5 to 5.0, to obtain a reaction product;

adding and dispersing an inorganic layered compound in the reaction product;

coating the reaction product containing the inorganic layered compound on a substrate surface; and heating the substrate surface coated with the reaction product at a temperature of not more than 200° C. to vitrify the reaction product and thereby obtain an inorganic composition as in claim 1.

19. The inorganic composition according to claim 1, wherein the swelling inorganic layered compound is natural smectite, synthetic smectite or swelling synthetic mica.

20. The film according to claim 17, wherein the swelling inorganic layered compound is natural smectite, synthetic smectite or swelling synthetic mica.

21. The film according to claim 17, wherein the swelling inorganic layered compound is present in an amount of 0.001 to 0.2 at mass ratio with respect to the inorganic matrix.

* * * * *